United States Patent
Alharbi et al.

(10) Patent No.: US 12,546,599 B2
(45) Date of Patent: Feb. 10, 2026

(54) TOOLFACE OFFSET MEASUREMENT TOOL

(71) Applicant: SAUDI ARABIAN OIL COMPANY, Dhahran (SA)

(72) Inventors: Atallah N. Alharbi, Dammam (SA); Faisal K. Al-Swailem, Khobar (SA); Richard Mark Pye, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 204 days.

(21) Appl. No.: 18/441,803

(22) Filed: Feb. 14, 2024

(65) Prior Publication Data

US 2025/0257995 A1 Aug. 14, 2025

(51) Int. Cl.
*G01C 15/00* (2006.01)
*E21B 7/06* (2006.01)

(52) U.S. Cl.
CPC .............. *G01C 15/006* (2013.01); *E21B 7/06* (2013.01)

(58) Field of Classification Search
CPC ......... G01C 15/006; E21B 7/06; E21B 17/10; E21B 3/02; E21B 44/04
See application file for complete search history.

(56) References Cited

U.S. PATENT DOCUMENTS 6,708,782 B1  3/2004  Turney

FOREIGN PATENT DOCUMENTS

| CN | 202064934 U | 12/2011 | |
|----|----|----|----|
| CN | 203835377 U | 9/2014 | |
| CN | 107916921 A | 4/2018 | |
| CN | 209687483 U | 11/2019 | |
| CN | 111305821 A | 6/2020 | |
| CN | 211851824 U | 11/2020 | |
| WO | WO-2018013632 A1 * | 1/2018 | ............. E21B 17/05 |

* cited by examiner

*Primary Examiner* — Georgia Y Epps
*Assistant Examiner* — Don J Williams
(74) *Attorney, Agent, or Firm* — Vorys, Sater, Seymour and Pease LLP

(57) ABSTRACT

A bottom-hole assembly includes a measurement while drilling (MWD) tool with a first reference line, a downhole directional tool operatively coupled to the MWD tool and arranged downhole therefrom, the downhole directional tool including a second reference line, a projection device securable to the MWD tool and including a mount that includes opposing upper and lower clamps, and a spacer extending between the upper and lower clamps, an instrument line provided on the mount and alignable with the first reference line and a projection instrument operatively coupled to the mount and operable to generate and convey a beam of light and a projection detection sensor securable to the downhole directional tool and aligned with the second reference line, the projection detection sensor being arranged to receive the beam of light.

20 Claims, 5 Drawing Sheets

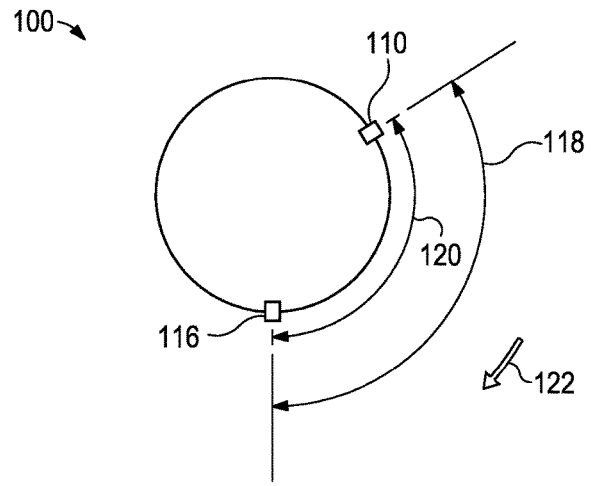
FIG. 1B
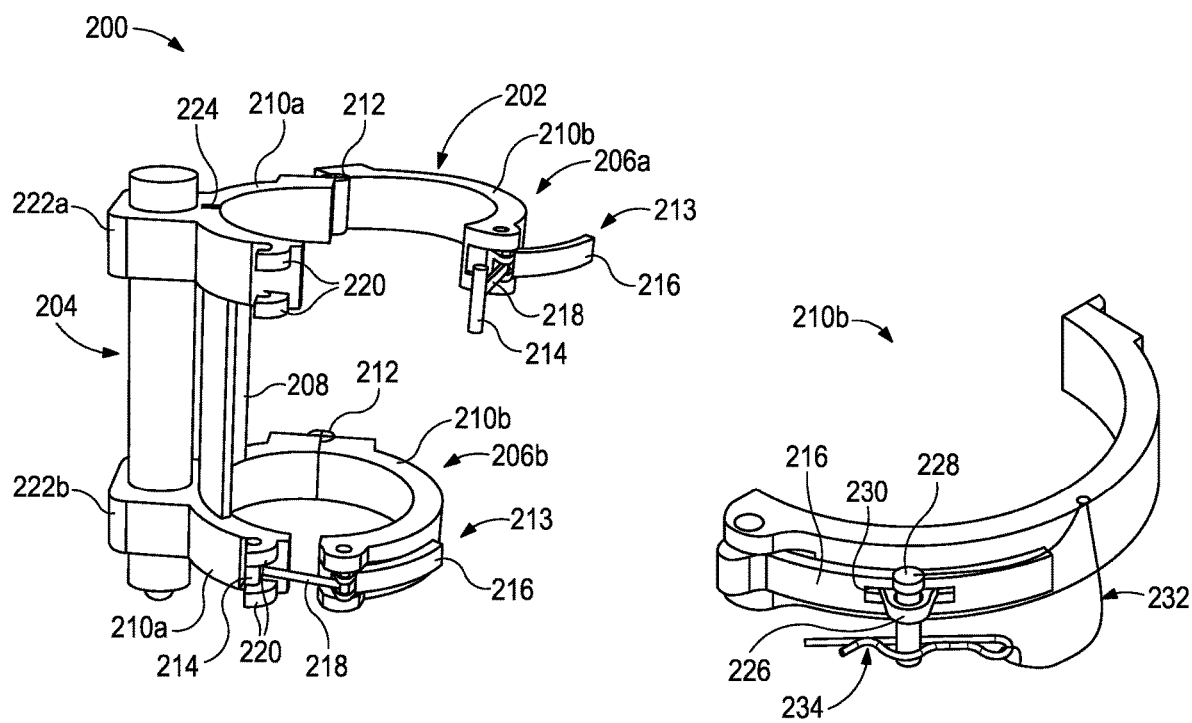
FIG. 2A
FIG. 2B

TOOLFACE OFFSET MEASUREMENT TOOL

FIELD OF THE DISCLOSURE

The present disclosure relates generally to downhole tools used in the oil and gas industry and, more particularly, to a device and method for determining an angular offset measurement between downhole tools with greater accuracy.

BACKGROUND OF THE DISCLOSURE

In oil and gas well construction it is often necessary to steer a well in a desired direction or maintain a specific inclination. In the case of wells targeting relatively small hydrocarbon reservoirs, or similarly those requiring a very specific trajectory, maintaining direction and inclination is critical. Some bottom hole assemblies (BHA) used in well construction include a drill bit, a downhole motor that powers the drill bit, and a Measurement While Drilling (MWD) tool used to obtain directional surveys (e.g., azimuth, inclination, etc.) in real-time. The direction or trajectory of the bit can be determined by orienting the MWD tool to a desired toolface, which can be determined by the angular offset distance between the orientation line of the downhole motor and an orientation line associated with the MWD tool.

Other BHAs include a whipstock used to divert or direct the drill bit in a desired trajectory away from the wellbore, such as in applications where a lateral wellbore is to be drilled. An MWD tool may be used to orient the whipstock in the same manner by determining the angular offset between respective orientation lines of the components.

Prior to extending a motor or whipstock into a well, the respective downhole tool must first be mated to the MWD tool in the BHA at surface. Often additional downhole components are added to the BHA and positioned between the MWD tool and the motor or whipstock. Consequently, there is often a substantial amount of distance between the MWD tool and the motor or whipstock. As a result, the respective orientation lines of the components are unlikely to be axially aligned when the entirety of the BHA is mated together. Accordingly, prior to extending the BHA into the well, it is necessary to determine via measurement, the angular offset between the MWD tool and the motor or whipstock so that the well may be created in the intended direction.

As more components are added between the MWD tool and the motor or whipstock, ensuring the accuracy of the offset measurement becomes more difficult. Due to the criticality of steering and/or positioning a well in the intended direction, greater precision in determining the angular offset between downhole components is highly advantageous. A method of accurately determining the angular offset that decreases operational time and substantially reduces the presence of personnel within areas of danger is also extremely desirable.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a bottom-hole assembly (BHA) may comprise a measurement while drilling (MWD) tool including a first reference line and a downhole directional tool operatively coupled to the MWD tool and arranged downhole therefrom. The downhole directional tool may include a second reference line. The BHA may also comprise a projection device securable to the MWD tool and including a mount that includes opposing upper and lower clamps, and a spacer extending between the upper and lower clamps. The projection device may further include an instrument line provided on the mount and alignable with the first reference line and a projection instrument operatively coupled to the mount and operable to generate and convey a beam of light. A projection detection sensor may be securable to the downhole directional tool and aligned with the second reference line, the projection detection sensor being arranged to receive the beam of light.

According to an embodiment consistent with the present disclosure, a method may comprising making up a bottom hole assembly (BHA) wherein the BHA may include a measurement while drilling (MWD) tool including a first reference line, a downhole directional tool operatively coupled to the MWD tool and arranged downhole therefrom wherein the downhole directional tool may include a second reference line. The method may include mounting a projection device to the MWD tool, the projection device including a mount that includes opposing upper and lower clamps and a spacer extending between the upper and lower clamps as well as a projection instrument operatively coupled to the mount. The method may include aligning an instrument line provided on the mount with the first reference line and thereby aligning the projection device with the MWD tool. The method may include mounting a projection detection sensor to the downhole directional tool wherein the projection detection sensor may include a reference point. The method may include aligning the reference point with the second reference line, activating the projection device and conveying a beam of light to the projection detection sensor and calculating an angular offset between the first and second reference lines based on an arc length between the reference point and a location where the beam of light impinges on the projection detection sensor.

According to an embodiment consistent with the present disclosure, a projection device may comprise a mount configured to be secured to the exterior of a downhole tool wherein the mount may include an upper clamp, a lower clamp axially offset from the upper clamp and a spacer extending between the upper and lower clamps as well as a projection instrument operatively coupled to the mount and operable to generate and convey a beam of light.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 1B is an example reference point measurement diagram used to determine toolface offset for the BHA of FIG. 1A.

FIG. 2A is an isometric side view of an example projection device, according to the present disclosure.

FIG. 2B is an isometric view of an alternative example of the hinged portion of the clamps of FIG. 2A, according to one or more embodiments.

DETAILED DESCRIPTION

Figure 1A:
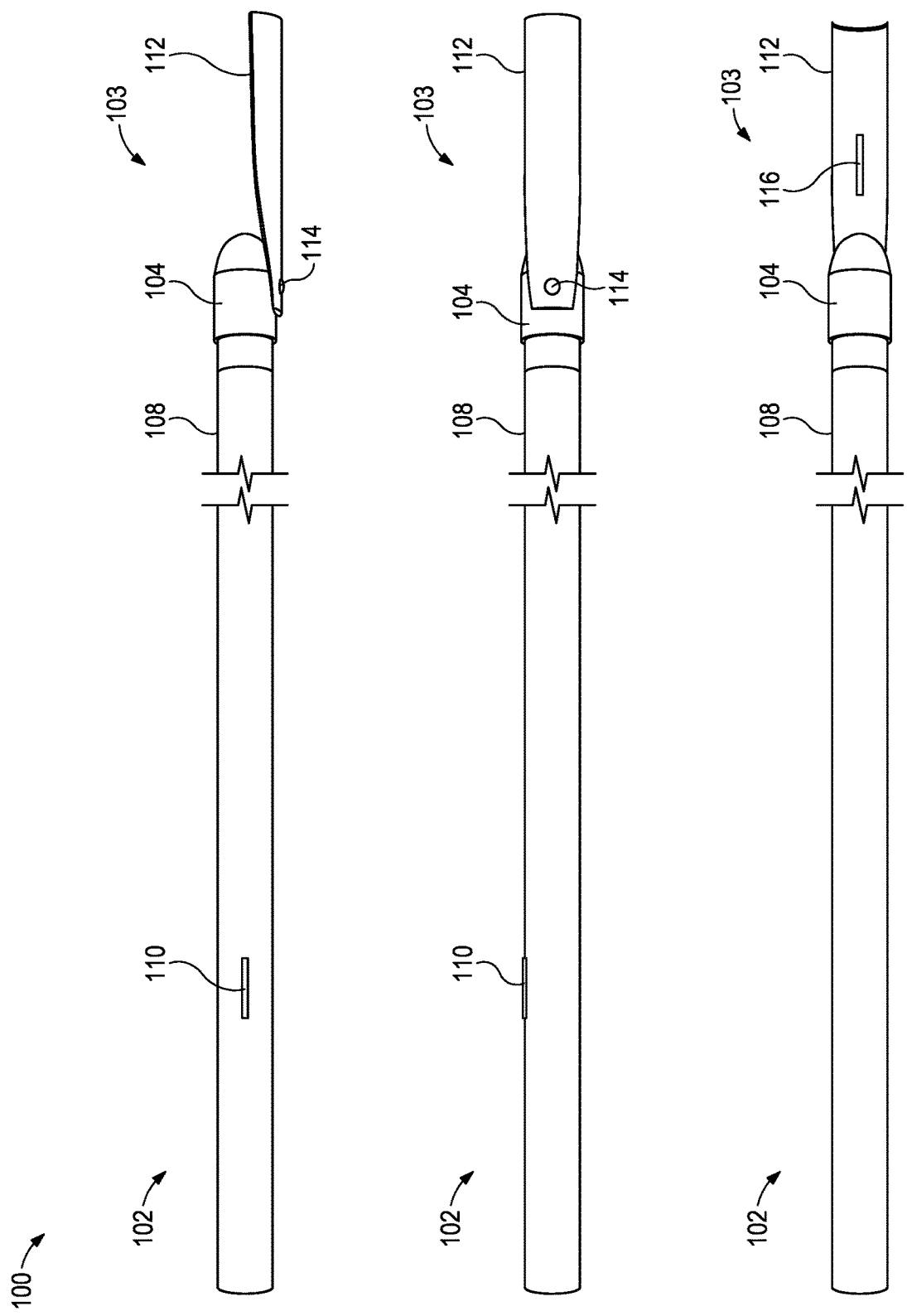
FIG. 1A depicts corresponding side, bottom, and top views of an example bottom hole assembly that may employ one or more principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to downhole tools used in the oil and gas industry and, more particularly, to a device and method for determining an angular offset measurement between downhole tools, with greater accuracy. Specifically, the device disclosed herein includes a projection component and a separate projection receiving component that may be used to more accurately determine the angular offset between respective orientation lines associated with downhole tools that may be positioned non-adjacently. The device and methods described are operable to reduce the amount of operational time often associated with measuring angular offsets. The measurement device and method described removes the potential for human error and better ensures accuracy thereby mitigating the risk of drilling or orienting a well in an undesirable and/or unintended direction. Lastly, the device and method described removes onsite personnel from areas/zones of danger and thus reduces the potential for injury to personnel.

FIG. 1A depicts corresponding side, bottom, and top views of an example bottom hole assembly (BHA) 100 that may employ one or more principles of the present disclosure. In particular, the BHA 100 is shown from three different orientations (perspectives) for illustrative purposes; the upper image depicting a side view, the middle image depicting a bottom view, and the bottom image depicting a top view. As illustrated, the BHA 100 may include a measurement while drilling (MWD) tool 102 and a downhole directional tool 103 operatively coupled to the MWD tool 102 and forming the distal (downhole) end of the BHA 100. As used herein, the term "operatively coupled," and any variations thereof, refers to a direct or indirect coupling between two component parts. In other embodiments, the MWD tool 102 may be replaced by a universal bottom hole orienting sub (UBHO), alternatively referred to as a "mule shoe." In such an embodiment the UBHO is operable to orient directional survey equipment (e.g., gyroscopic tools) that may be extended into and retained within the UBHO.

The downhole directional tool 103 may comprise any tool or component arranged at the downhole end of the BHA 100 requiring orientation with the MWD tool 102 and for which any angular offset (misalignment) must be corrected to enable proper operation and/or setting of the downhole directional tool 103. In some embodiments, for example, the downhole directional tool 103 may comprise a drill bit operatively coupled to a motor configured to operate the drill bit and thereby steer a wellbore in a desired direction. In other embodiments, however, and as depicted in FIG. 1A, the downhole directional tool 103 may comprise a whipstock assembly including a mill 104 configured to mill out a portion of a cased wellbore in preparation for drilling a lateral or "sidetrack" wellbore. In yet other embodiments, the downhole directional tool may comprise a bent sub.

In some embodiments, the BHA 100 may include one or more additional downhole tool(s) 108 interposing the MWD tool 102 and the downhole directional tool 103, which may comprise any number of known downhole components. Examples of the additional downhole tools 108 include, but are not limited to, formation evaluation tools (e.g., logging while drilling tools or "LWD" tools), non-magnetic drill collars, drill collars, stabilizers, centralizers, reamers, and the like.

As illustrated, the downhole directional tool 103 comprises a whipstock assembly including the mill 104, which is releasably coupled to an inclined plane, referred to herein as a "whipstock" 112. Although the BHA 100 is described in reference to a whipstock setting operation, it will be appreciated that the various embodiments discussed herein are equally well suited for use in conjunction with other downhole directional tools 103 requiring alignment and offset toolface measurement determination, i.e., directional drilling.

The MWD tool 102 may be configured to provide directional measurements in real-time and thereby direct the trajectory of a well. The directional information provided includes the position and orientation of the MWD tool 102 (or more specifically, the location of sensors embedded therein) within three-dimensional space. An operator may communicate with the MWD tool 102 to make steering adjustments to the BHA 100 in order to change or maintain the trajectory of the well as needed. In doing so, the operator may rely upon toolface measurements collected by the MWD tool 102 that may then be transmitted to and observed at the surface of the well. Depending upon the inclination (deviation) of the well at any given depth, the toolface may be either magnetic (measurements are taken relative to magnetic north) or gravity (alternatively referred to as high-side wherein measurements are taken relative to an "up" position or the high-side of the downhole component and measured clockwise relative to "up"). As illustrated, the MWD tool 102 may include a reference line 110 associated with the high-side of the MWD tool 102. The reference line 110 may be used to measure an offset angle between the MWD tool 102 and the downhole directional tool 103. In embodiments where a reference line 110 is not visible, the operator may use another reference point on the MWD tool 102 that is known to correspond to the "high-side" of the MWD tool 102 (e.g., a plug covering a port).

The whipstock assembly may include a whipstock fastener 114 operable to releasably secure the mill 104 to the whipstock 112. The whipstock fastener 114 may be configured to shear upon assuming a predetermined axial load, thereby freeing the mill 104 from the whipstock 112. The whipstock assembly is operable to direct the mill 104 (or a drill bit) away from the longitudinal axis of the wellbore to form a secondary wellbore extending from the parent wellbore. When set within the parent wellbore, the whipstock 112 helps to deflect the mill 104 into an inner wall of the parent wellbore to mill out a section of the wellbore in preparation for drilling the secondary wellbore. In some applications, the inclined plane of the whipstock 112 may be arcuate, and thus able to cradle and guide the mill 104 into contact with the inner wall of the wellbore during operation.

The mill 104 may comprise a generally cylindrical body and a plurality of cutters or milling elements (not shown) may be secured to the body. Once freed from the whipstock 112, the mill 104 may be advanced downhole and the whipstock 112 guides the mill 104 into the inner wall of the wellbore (e.g., casing or liner secured within the wellbore). Rotating the mill 104 while in contact with the inner wall of the wellbore will grind and/or drill out a section of the wellbore wall for the purposes of exiting the primary wellbore and forming the secondary wellbore.

The downhole directional tool 103 may also include a reference line 116, as shown in the bottom image of FIG. 1A. The reference line 116 may be used to help determine the angular offset between the downhole directional tool 103 and the MWD tool 102. In embodiments where the downhole directional tool 103 comprises the whipstock assembly, the reference line 116 may be provided on or in reference to the whipstock 112, such as at a central location on the inclined plane (e.g., the bottom of the arcuate surface). In other embodiments, however, the reference line 116 may be provided on the whipstock fastener 114 or with reference thereto.

Prior to extending the BHA 100 into a well (not shown), all the components of the BHA 100 are coupled together so that the combined BHA 100 may be lowered into the well simultaneously. The components included within the BHA 100 may be operatively coupled via rotary connections or threaded engagements. Accordingly, when present, the uphole end of the downhole tool(s) 108 may be threaded to a downhole end of the MWD tool 102, and the uphole end of the downhole directional tool 103 (e.g., the whipstock assembly 103) may be threaded to a downhole end of the downhole tool(s) 108. In embodiments that omit the downhole tool(s) 108, however, the uphole end of the downhole directional tool 103 may be threaded to a downhole end of the MWD tool 102.

Threadably coupling the components included in the BHA 100, alternately referred to as "making up," may occur on a rig floor of a rig where the rig derrick and rotary table further enable the "make-up" of the BHA 100. The rig may comprise any type of oil and gas platform or rig that may be geographically positioned offshore or onshore. When all of the connections comprising threaded engagements are torqued to their required and recommended make-up torque settings, the reference line 110 of the MWD tool 102 and the reference line 116 of the downhole directional tool 103 may be angularly misaligned. In order to ensure that the downhole directional tool 103 is set in the intended direction when the BHA 100 is extended into the well, an offset angle between the reference lines 110, 116 must be calculated and consequently accounted for during the downhole directional tool 103 setting procedures.

FIG. 1B is an example reference point measurement diagram used to determine toolface offset for the BHA 100. More specifically, FIG. 1B is a schematic end view of the BHA 100 showing the angular orientation of the reference line 110 of the MWD tool 102 (FIG. 1A) and the reference line 116 of the downhole directional tool 103 (e.g., the whipstock assembly of FIG. 1A) upon building the BHA 100. As illustrated, the reference lines 110, 116 are angularly offset from each other by an offset angle 118. To account for the misalignment and to ensure the downhole directional tool 103 is set in an intended angular direction, the offset angle 118 must be accurately calculated. As the BHA 100 is advanced into the well, the MWD tool 102 may transmit real-time toolface measurements representative of the location of the MWD tool 102. The transmitted toolface measurements take into account the offset angle 118 so that the downhole directional tool 103 may be aligned in a predetermined angular orientation and direction. Due to the physical distance (length) between the respective reference lines 110, 116 resulting from the intervening components (e.g., the mill 104, the additional downhole tools 108, etc.), determining the offset angle 118 may be challenging. In some embodiments, the distance between the MWD tool 102 and the downhole directional tool 103 may be approximately 30 ft. or more, while in other embodiments, the distance may be significantly more, e.g., greater than or equal to 80 ft.

In conventional operations, to determine the offset angle 118, the BHA 100 is maneuvered on the rig floor so an operator (also positioned on the rig floor), after noting the location of the reference line 116 of the downhole directional tool 103, can physically mark the intervening downhole tools 108, and ultimately the MWD tool 102, with a designation that angularly aligns with reference line 116. The final marking, representative of the reference line 116 (often referred to as a "scribe line") and made with a marking device (e.g., chalk, paint, etc.), will be located near enough the reference line 110 of the MWD tool 102 so that the angular distance between the reference lines 110, 116 can be measured. This process may require several iterations where the entirety of the BHA 100 is lifted into the derrick and lowered so that the operator may visibly confirm ("eyeball") the location of the scribe line is as accurate as possible. Once the operator is satisfied with the location of the scribe line, the operator may physically measure the distance between the reference line 110 of the MWD tool 102 and the scribe line, and thereby measure an arc length 120 between the reference lines 110, 116, using a flexible tape. The operator also measures the circumference of the MWD tool 102, and utilizing both measurements the operator calculates the offset angle 118 using the formula: (arc length/circumference)×360°. The calculated offset angle 118 may then be entered into software in communication with the MWD tool 102 and operable to correct the real-time (often referred to as "raw") toolfaces for the input offset angle 118. The corrected toolface may then be used to accurately direct the trajectory of the well and/or the setting position of the downhole directional tool 103.

The foregoing conventional method for determining the offset angle 118 is highly dependent on the operator and is thus subject to human error that may ultimately be costly. Potential human errors include but are not limited to misreading the measuring tape, measuring in the wrong direction (e.g., not in the clockwise direction 122), and miscalculating the offset angle 118. Most obvious is the potential for error in designating the scribe line associated with the reference line 116 as the BHA 100 is lowered and lifted within the derrick. The conventional methodology described rests upon the accuracy of the operator's "eye-balling" the scribe line onto the components of the BHA 100 and ultimately, the MWD tool 102. In addition to the large potential for inaccuracy, the aforementioned conventional method requires the positioning of an operator (or operators) on the rig floor and in close proximity to the large and heavy components of the BHA 100 that if dropped, have the potential to severely injure and/or kill a person within the area. The conventional methods generally require multiple checks and repositioning of the BHA 100 within the derrick, thus resulting in additional time spent.

According to embodiments of the present disclosure, the presently described systems and methods of determining the offset angle 118 remove much of the potential human error associated with conventional methods and may thus simultaneously improve the accuracy of the calculated offset angle 118. As a result, the trajectory of the well may be more accurate, which may result in enhanced and more efficient oil and gas production. Moreover, the disclosed method limits the amount of time an operator must be in close proximity to the BHA 100 as the BHA 100 is moved within the derrick, thereby reducing the risk of injury to personnel. Furthermore, the systems and methods of determining the offset angle 118 taught herein reduce the time spent determining the offset angle 118, thus reducing the overall cost of well construction.

FIG. 2A is an isometric, side view of an example projection device 200 that may employ one or more principles of the present disclosure, according to one or more embodiments. The projection device 200 may be operable to help determine the offset angle 118 as discussed with reference to FIG. 1B.

As illustrated, the projection device 200 may include a mount 202 and a projection instrument 204 operatively coupled to the mount 202. The projection device 200 is configured to be positioned about and secured to the exterior of a downhole tool. More particularly, the mount 202 may be configured to be attached to the MWD tool 102 (FIG. 1A) and the projection instrument 204 may be operable to generate and project (convey) a beam of light along the length of the BHA 100 (FIG. 1A). In some embodiments, the projection instrument 204 may comprise a laser, which may include an internal energy source (e.g., batteries, fuel cells, etc.) that provides the necessary power to convey the beam of light. In other embodiments, the projection instrument 204 may comprise other types of light projection (conveying) instruments including, but not limited to, light emitting diodes (LED).

To ensure the safety of personnel and to prevent ignition hazard, the projection instrument 204 may be rated to the necessary and desirable degree of ingress protection in accordance with industry standards specific to zones of operation. Accordingly, the projection instrument 204 may be rated to prevent the ingress of gas or otherwise.

Moreover, in one or more embodiments, the projection instrument 204 may be activated and deactivated via remote operation. Consequently, the operator may activate the projection instrument 204 at a remote location and some distance away from the rotary table. In other embodiments, however, the projection instrument 204 may have an external on/off switch that may be manually toggled by the operator. In some embodiments, as illustrated, the projection instrument 204 may be generally cylindrical and exhibit a circular cross-section. In other embodiments, the projection instrument 204 may exhibit a polygonal cross-section, or may be any other suitable shape.

The mount 202 may be designed to retain the projection instrument 204 so that the projection instrument 204 may remain parallel or substantially parallel to the downhole tool to which it is attached. Maintaining a parallel position helps to better ensure an accurate representation of the reference line 110 later in the operation. As illustrated, the mount 202 may include a first or "upper" clamp 206a and a second or "lower" clamp 206b axially offset from the upper clamp 206a. The upper and lower clamps 206a,b may be operatively coupled to each other and separated by a spacer 208 extending between the upper and lower clamps 206a,b.

As illustrated, each clamp 206a,b may comprise or provide a stationary portion 210a and a hinged portion 210b. Each stationary and hinged portion 210a,b may be pivotably coupled via a hinge 212, which enables the clamps 206a,b to "open" and receive the downhole tool (e.g., the MWD tool 102) and subsequently "close" to secure the projection device 200 to the downhole tool.

Each hinged portion 210b further includes a latching mechanism 213 operable to secure the hinged portion 210b to the stationary portion 210a when the corresponding clamp 206a,b is transitioned to the closed state. The upper clamp 206a is shown in FIG. 2A in an open state prior to securing the latching mechanism 213, and the lower clamp 206b is shown in the closed state after the latching mechanism 213 has been engaged.

In some embodiments, as illustrated, the latching mechanism 213 may include an engagement pin 214 and an engagement latch 216 pivotably attached to the hinged portion 210b. The engagement pin 214 may be operatively coupled to the engagement latch 216 via an extension bar 218. As illustrated, one or more retention hooks 220 may be provided on the stationary portion 210a and sized to receive the engagement pin 214. Once the engagement pin 214 is received within the retention hooks 220, the engagement latch 216 may be forced manually in a direction opposite the engagement pin 214, thereby applying tension to the extension bar 218 and securing the engagement pin 214 in place within the retention hooks 220.

The clamps 206a,b may be configured to secure the projection device 200 to a downhole tool, such as the MWD tool 102 (FIG. 1A), and prevent the projection device 200 from slipping down the body of the MWD tool 102. The stationary and hinged portions 210a,b may each exhibit a curved or arcuate shape having a radius that substantially matches the curvature and outer diameter (OD) of the MWD tool 102. The clamps 206a,b may be manufactured such that they are able to extend about the outer circumference of downhole tools of a variety of sizes and ODs including, but not limited to, an OD of 4.75 inches, 5 inches, 6.75 inches, 7 inches, 8.25 inches, 9 inches, and 9.5 inches.

In some embodiments, the spacer 208 may also exhibit a curved or arcuate shape that substantially matches the curvature of the downhole tool (e.g., the MWD tool 102 of FIG. 1A). In at least one embodiment, the spacer 208 may comprise an integral extension of the stationary portions 210a and extend between the clamps 206a,b. The spacer 208 may be operable to provide the necessary rigidity and/or support to maintain alignment of the upper and lower clamps 206a,b so that the projection instrument 204 may remain substantially parallel to the longitudinal axis of the MWD tool 102. In other embodiments, the projection device 200 may include more than one spacer 208 operatively coupled to or forming part of the clamps 206a,b.

The mount 202 may further include one or more flanges, shown as a first or "upper" flange 222a and a second or "lower" flange 222b. The flanges 222a,b may be used to mount and otherwise secure the projection instrument 204 to the mount 202. In some embodiments, as illustrated, the flanges 222a,b may form part of the stationary portion 210a of each clamp 206a,b. The projection instrument 204 may be secured to the flanges 222a,b via a variety of securing means including, but not limited to, an interference fit, an adhesive, one or more mechanical fasteners (e.g., bolts, etc.), or any combination thereof. In another embodiment, the lower flange 222b may comprise a tapered interior body so that the inner diameter of the lower flange 222b, at its most distal end, is less than the inner diameter of the lower flange 222b at its opposing end. The tapered inner body thereby defining a shoulder upon which the lower (distal) end of the projection instrument 204 may rest once the projection instrument 204 is positioned within the flanges 222a,b. In such an embodiment, the lower (distal) end of the projection instrument 204 would not extend below the base of the lower flange 222b, as it is currently shown in FIG. 2A.

The projection device 200 may further include an instrument line 224 configured to be aligned with the reference line 110 (FIG. 1A) of the MWD tool 102 (FIG. 1A) when the projection device 200 is secured thereto. By aligning the instrument line 224 with the reference line 110, the projection instrument 204 will be properly aligned angularly with the high-side of the MWD tool 102. When securing the projection device 200 to the MWD tool 102, the operator angularly aligns the instrument line 224 with the reference line 110, such that the beam of light generated and conveyed by the projection instrument 204 will effectively extend the reference line 110 along the longitudinal axis of the BHA 100 (FIG. 1A). The instrument line 224 may be provided on the mount 202, such as on the stationary portion 210a of the upper clamp 206a, but could alternatively be provided on other portions of the mount 202, without departing from the scope of the disclosure.

FIG. 2B is an isometric view of an alternative example of the hinged portion 210b of the clamps 206a,b of FIG. 2A, according to one or more embodiments. In some embodiments, as illustrated, the hinged portion 210b may include a means of secondary retention. More specifically, the hinged portion 210b may include a lug 226 configured to receive and retain a retention pin 228. The lug 226 may be provided on the exterior of the hinged portion 210b such that it projects outwardly from the hinged portion 210b, and may be operatively coupled to the hinged portion 210b by any known means, such as by welding or mechanical fasteners. In the illustrated embodiment, the engagement latch 216 may define an aperture 230 sized to receive the lug 226 when the engagement latch 216 is engaged and applying tension to the extension bar 218 (FIG. 2A). Once the engagement latch 216 is closed and the lug 226 extends (protrudes) through the aperture 230, the retention pin 228 may be inserted into an aperture defined in the lug 226, which helps prevent accidental release of the engagement latch 216. The retention pin 228 may provide an enlarged head that prevents the retention pin 228 from passing through the aperture in the lug 226.

In some embodiments, a tether 232 may be operatively coupled to the retention pin 228 and further coupled to the hinged portion 210b to help prevent inadvertent loss of the retention pin 228. In some embodiments, a safety clip 234 may be used to help retain the retention pin 228 in place at the lug 226. The safety clip 234 may comprise, for example, a cotter pin or the like and may be sized to be received within an orifice defined in and through the body of the retention pin 228. When inserted into the orifice, the safety clip 234 may prevent the retention pin 228 from dislodging from the lug 226. In at least one embodiment, as illustrated, the tether 232 may also be attached to the safety clip 234 to help prevent inadvertent loss of the safety clip 234.

Figure 3A:
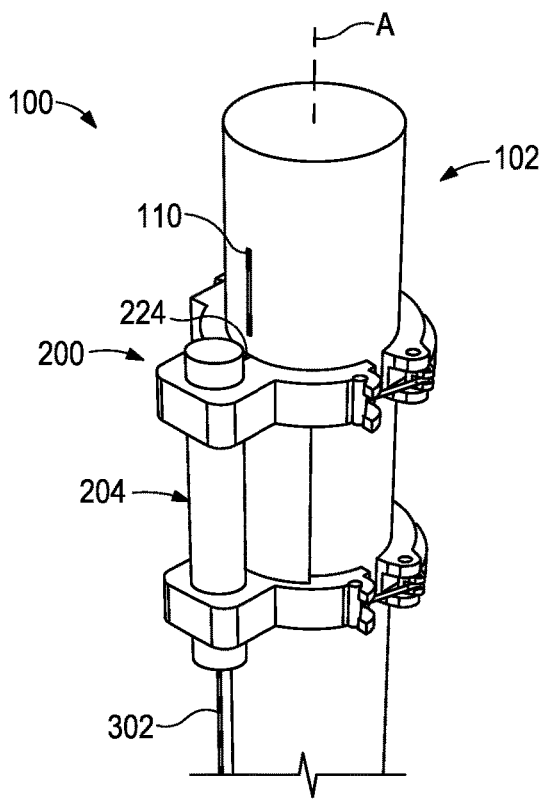
FIGS. 3A and 3B are isometric front and perspective views, respectively, of the projection device coupled to the MWD tool, according to one or more embodiments.
Figure 3B:
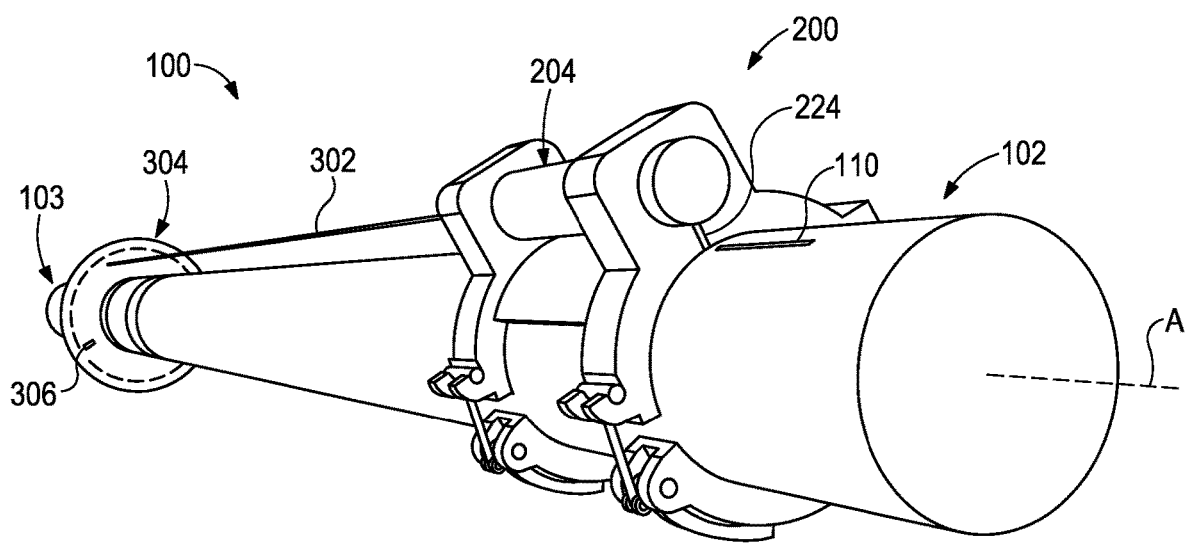

FIGS. 3A and 3B are isometric front and perspective views, respectively, of the projection device 200 coupled to the MWD tool 102, according to one or more embodiments. The projection device 200 may be attached and secured to the MWD tool 102 using the upper and lower clamps 206a,b and the latching mechanism 213, as generally described above with reference to FIG. 2A. Moreover, the projection device 200 is secured to the MWD tool 102 so that the instrument line 224 angularly aligns with the reference line 110 of the MWD tool 102. As a result, a beam of light 302 (e.g., a laser) generated and projected by the projection instrument 204 will travel in a line substantially parallel with a longitudinal axis A of the MWD tool 102 and aligned with the reference line 110.

Once the projection device 200 is attached to the MWD tool 102 and aligned with the reference line 110, the BHA 100 may be raised until the reference line 116 (FIG. 1A) of the downhole directional tool 103 (e.g., the whipstock assembly of FIG. 1A) is positioned above the rig floor and visible to the rig operator. A projection detection sensor 304 may then be secured to the BHA 100 at or near the downhole directional tool 103 so that the projection detection sensor 304 may be angularly aligned with the reference line 116. In particular, the projection detection sensor 304 may provide or otherwise define a reference indicator or "point" 306, and the operator may angularly align the reference point 306 with the reference line 116. Consequently, as the beam of light 302 impinges upon the projection detection sensor 304, the projection detection sensor 304 may detect the conveyed light 302. In some instances, due to the length of the BHA 100, bending may occur such that once the projection instrument 204 is activated, the conveyed light 302 may be projected beyond the outermost diameter of the projection detection sensor 304. In such an embodiment, a trimming mechanism (not shown) disposed within the projection device 200 may be operable to shift the conveyed light 302 within the detection range of the projection detection sensor 304. In such an embodiment, the conveyed light 302 may be shifted greater than or less than approximately 5°.

In another embodiment, the projection device 200 may include three or more projection instruments 204 spaced equidistantly from each other about the MWD tool 102. In some embodiments, the mount 202 may be reconfigured to secure each projection instrument 204. Alternatively, however, each projection instrument 204 may be secured to an independent mount 202, without departing from the scope of the disclosure. In such embodiments, operating each projection instrument 204 simultaneously may be helpful in visualizing eccentricity of the BHA 100 (or the interposing pipe) as the BHA 100 is suspended within the rig derrick. Moreover, operating each projection instrument 204 simultaneously may help visualize the scribe line.

Figure 4:
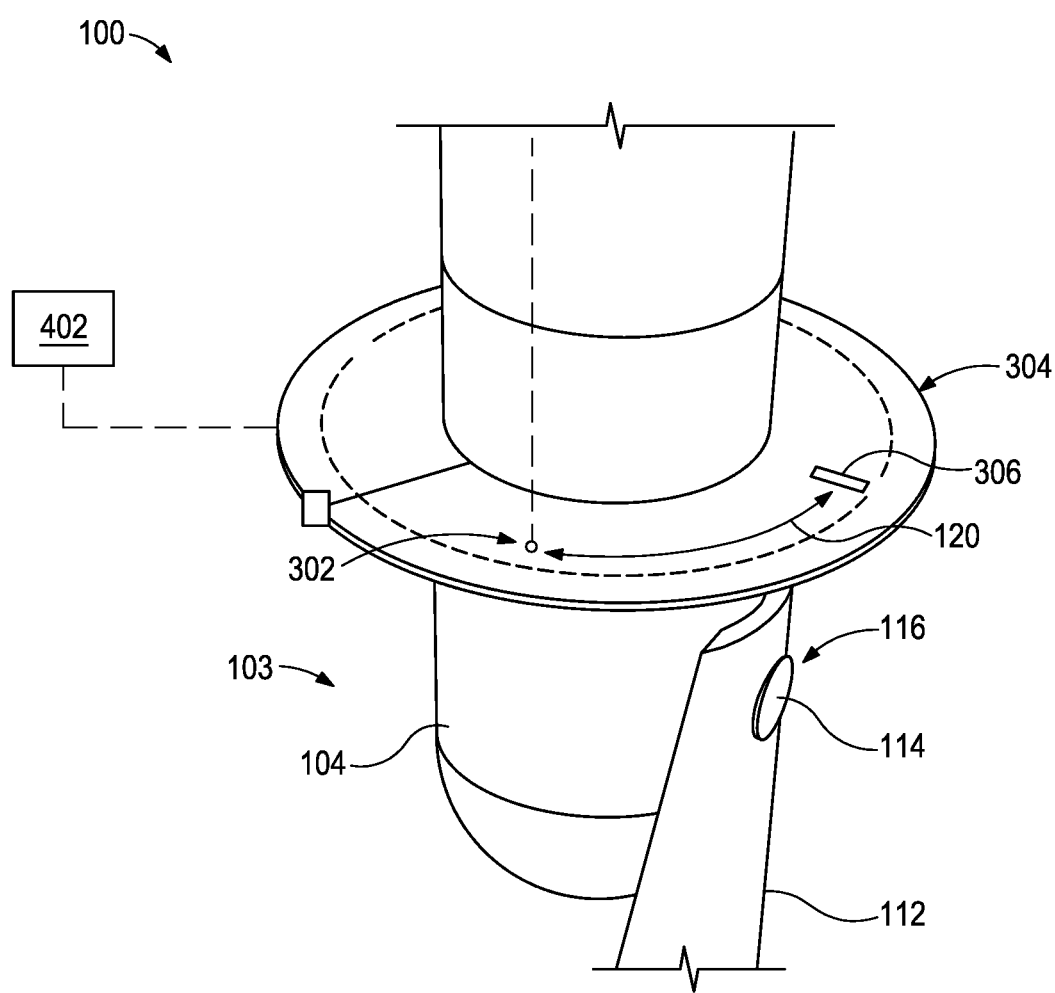
FIG. 4 is an enlarged isometric view of a projection detection sensor secured to the downhole directional tool for FIG. 1A, according to one or more embodiments.

FIG. 4 is an enlarged isometric view of the projection detection sensor 304, according to one or more embodiments. As shown, the reference line 116 may be aligned with the whipstock fastener 114. In at least one embodiment, the projection detection sensor 304 may comprise a generally circular component that is hinged so that it may fit around and secure to multiple diameters of downhole directional tool(s) 103. In some embodiments, the projection detection sensor 304 may include sensors (not shown) embedded within the material or interior body (i.e., the circular component) of the projection detection sensor 304 and capable of detecting the beam of light 302. The sensors may be operable to reference their position relative to the point 306 (corresponding to the reference line 116) so that the arc length 120 between the point 306 and the location at which the projection detection sensor 304 detects the light 302 may be measured accurately. In other embodiments, the material of the projection detection sensor 304 may be made of a photosensitive material capable of detecting the location of the beam of light 302 where it impinges on the projection detection sensor 304.

In an embodiment, the projection detection sensor 304 may include a visible display 402 disposed thereon or otherwise in communication therewith. Upon detection of the light 302, the projection detection sensor 304 may then visibly display the arc length 120 on the display 402 so the operator can manually perform the offset angle calculation 118. In another embodiment, the projection detection sensor 304 may be operable to perform the aforementioned formulaic calculation to determine the offset angle 118. In such an embodiment, the offset angle 118 may be displayed upon the visible display 402 of the projection detection sensor 304.

In any embodiment, the operator may input the offset angle 118 into the software in communication with the MWD tool 102. In other embodiments, the offset angle 118, once determined by the projection detection sensor 304, may be transmitted to a control system (not shown) operable to transmit the offset angle 118 directly to the software in communication with the MWD tool 102.

Figure 5:
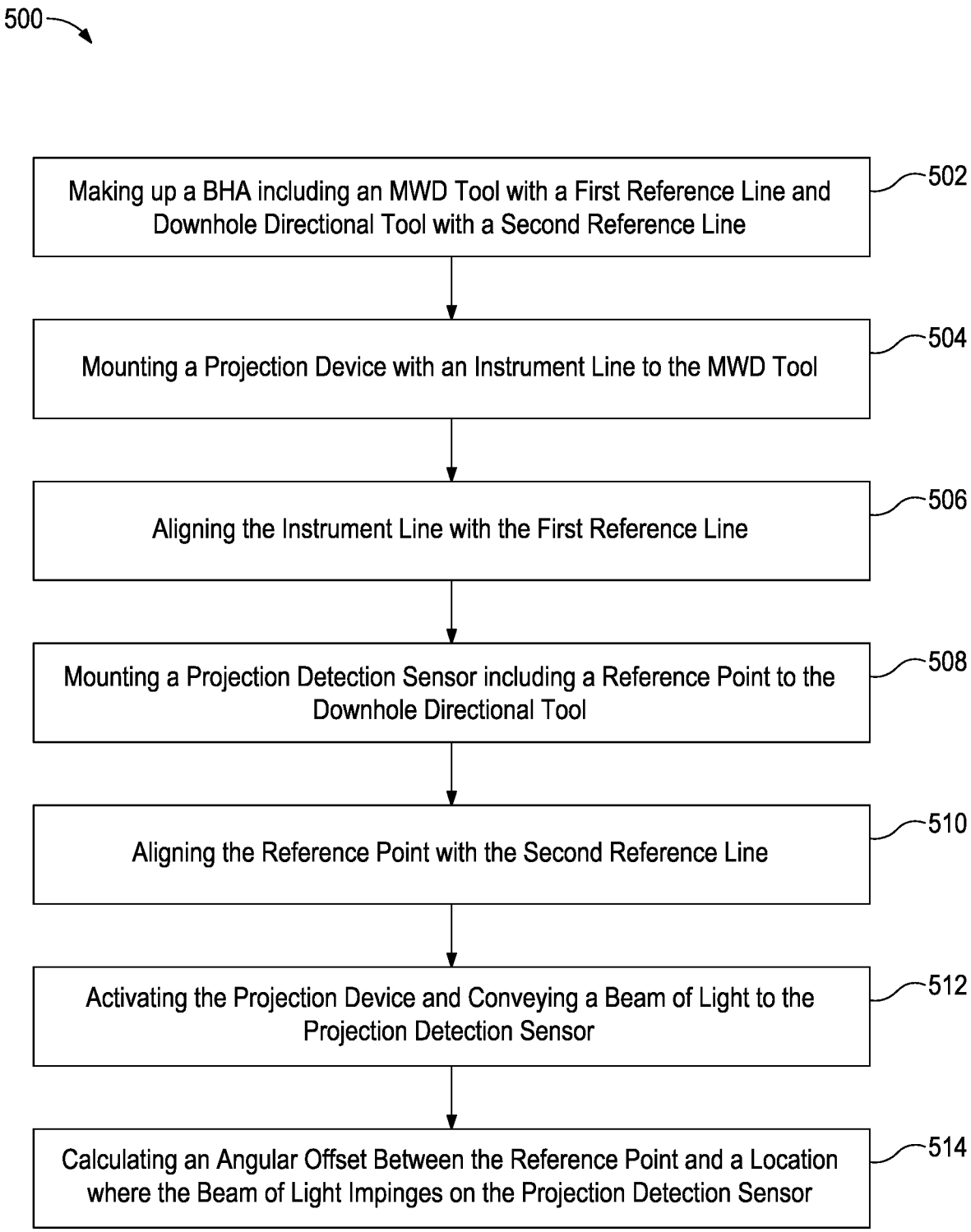
FIG. 5 is a schematic flow chart of an example angular offset measurement method, according to one or more embodiments.

FIG. 5 is a schematic flowchart of an example angular offset measurement method 500, according to one or more embodiments. The method 500 may be best understood with reference to FIGS. 1-4 provided herein. As illustrated, the method 500 may include making up a bottom hole assembly (BHA) that includes a measurement while drilling (MWD) tool having a first reference line and a downhole directional tool having a second reference line, as at 502. The downhole directional tool may be operatively coupled to and arranged downhole from the MWD tool. The BHA may also include one or more additional downhole tools positioned between the MWD tool and the downhole directional tool. The method 500 may further include, mounting a projection device including an instrument line, to the MWD tool, as at 504. The projection device may also include a mount having opposing upper and lower clamps, and a spacer extending between the upper and lower clamps as well as a projection instrument operatively coupled to the mount. The method 500 may continue by aligning the instrument line provided on the mount with the first reference line and thereby aligning the projection device with the MWD tool, as at 506. The method 500 may also include mounting a projection detection sensor having a reference point, to the downhole directional tool, as at 508. The method 500 may include aligning the reference point with the second reference line, at 510. The method 500 may continue by activating the projection device and thereby conveying a beam of light to the projection detection sensor, as 512. In some embodiments, the projection device may be remotely activated. Upon activation, the projection detection sensor may detect the light beam and measure the arc length between the reference point and a location where the beam of light impinges on the projection detection sensor. Lastly, the method 500 may include calculating an angular offset between the first and second reference lines based on an arc length between the reference point and a location where the beam of light impinges on the projection detection sensor, as at 514. In some embodiments, the measured arc length and/or the calculated angular offset may be displayed on a visible display disposed within the projection detection.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Embodiments disclosed herein include:

A. A bottom-hole assembly (BHA), the BHA including a measurement while drilling (MWD) tool including a first reference line, a downhole directional tool operatively coupled to the MWD tool and arranged downhole therefrom, the downhole directional tool including a second reference line, and a projection device securable to the MWD tool. The projection device including a mount that includes opposing upper and lower clamps and a spacer extending between the upper and lower clamps as well as an instrument line provided on the mount and alignable with the first reference line and a projection instrument operatively coupled to the mount and operable to generate and convey a beam of light and a projection detection sensor securable to the downhole directional tool and aligned with the second reference line, the projection detection sensor being arranged to receive the beam of light.

B. A method, including making up a bottom hole assembly (BHA). The BHA including a measurement while drilling (MWD) tool including a first reference line, a downhole directional tool operatively coupled to the MWD tool and arranged downhole therefrom, the downhole directional tool including a second reference line. The method including mounting a projection device to the MWD tool, the projection device including a mount that includes opposing upper and lower clamps, and a spacer extending between the upper and lower clamps and a projection instrument operatively coupled to the mount. The method including aligning an instrument line provided on the mount with the first reference line and thereby aligning the projection device with the MWD tool and mounting a projection detection sensor to the downhole directional tool, the projection detection sensor including a reference point. The method including aligning the reference point with the second reference line, activating the projection device and conveying a beam of light to the projection detection sensor and calculating an angular offset between the first and second reference lines based on an arc length between the reference point and a location where the beam of light impinges on the projection detection sensor.

C. A projection device including a mount configured to be secured to the exterior of a downhole tool, the mount including an upper clamp, a lower clamp axially offset from the upper clamp and a spacer extending between the upper and lower clamps. The projection device further including a projection instrument operatively coupled to the mount and operable to generate and convey a beam of light.

Each of embodiments A, B, and C may have one or more of the following additional elements in any combination: Element 1: wherein the downhole directional tool comprises at least one of a whipstock assembly and a drill bit with a bit motor. Element 2: wherein the upper and lower clamps further comprise a stationary portion, a hinged portion pivotably coupled to the stationary portion and a latching mechanism operable to secure the hinged portion to the stationary portion and thereby secure the projection device to the downhole tool. Element 3: wherein the latching mechanism further comprises an engagement latch pivotably attached to the hinged portion, an engagement pin operatively coupled to the engagement latch via an extension bar extending between the engagement latch and the engagement pin and one or more retention hooks provided on the stationary portion and sized to receive and secure the engagement pin. Element 4: wherein the hinged portion includes a secondary retention mechanism comprising a lug projecting outwardly from the hinged portion, an aperture defined in the engagement latch and sized to receive the lug and a retention pin sized to be received within the lug. Element 5: the bottom-hole assembly further comprising a safety clip configured to be received within an orifice defined in the retention pin and operable to prevent the retention pin from dislodging from the lug, a tether secured to the hinged portion and operatively coupled to both the retention pin and the safety clip. Element 6: wherein the stationary and hinged portions each exhibit a curved shape configured to extend about the outer circumference of the MWD tool. Element 7: wherein the mount further comprises one or more flanges operable to secure the projection instrument to the mount. Element 8: wherein the instrument line is positioned on the stationary portion of the upper clamp. Element 9: wherein the projection instrument is a laser or a light emitting diode (LED). Element 10: wherein the projection detection sensor includes a display operable to visually display at least one of an arc length or a calculated offset angle.

Element 11: removing the projection detection sensor from the downhole directional tool; lowering the BHA below a rotary table until the MWD tool is positioned above the rotary table; and removing the projection device from the MWD tool. Element 12: remotely activating the projection device. Element 13: mounting the projection instrument to the mount at one or more flanges of the mount. Element 14: detecting the light beam with the projection detection sensor; measuring the arc length between the reference point and a location where the beam of light impinges on the projection detection sensor; and displaying, on a display in communication with the projection detection sensor, a calculated offset angle.

Element 15: wherein the latching mechanism further comprises: an engagement latch pivotably attachable to the hinged portion of the upper and lower clamps; an engagement pin operatively coupled to the engagement latch via an extension bar extending between the engagement latch and the engagement pin; and one or more retention hooks provided on the stationary portion, sized to receive and secure the engagement pin.

By way of non-limiting example, exemplary combinations applicable to A, B and C include: Element 2 with Element 3; Element 3 with Element 4; Element 4 with Element 5; Element 6 with Element 2; and Element 16 with Element 17.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A bottom-hole assembly, comprising:
   a measurement while drilling (MWD) tool including a first reference line;
   a downhole directional tool operatively coupled to the MWD tool and arranged downhole therefrom, the downhole directional tool including a second reference line;
   a projection device securable to the MWD tool and including:
      a mount that includes opposing upper and lower clamps, and a spacer extending between the upper and lower clamps;
      an instrument line provided on the mount and alignable with the first reference line; and
      a projection instrument operatively coupled to the mount and operable to generate and convey a beam of light; and
   a projection detection sensor securable to the downhole directional tool and aligned with the second reference line, the projection detection sensor being arranged to receive the beam of light.

2. The bottom-hole assembly of claim 1, wherein the downhole directional tool comprises at least one of a whipstock assembly and a drill bit with a bit motor.

3. The bottom-hole assembly of claim 1, wherein the upper and lower clamps further comprise:
   a stationary portion;
   a hinged portion pivotably coupled to the stationary portion; and
   a latching mechanism operable to secure the hinged portion to the stationary portion and thereby secure the projection device to the downhole tool.

4. The bottom-hole assembly of claim 3, wherein the latching mechanism further comprises;

an engagement latch pivotably attached to the hinged portion;
an engagement pin operatively coupled to the engagement latch via an extension bar extending between the engagement latch and the engagement pin; and
one or more retention hooks provided on the stationary portion and sized to receive and secure the engagement pin.

5. The bottom-hole assembly of claim 4, wherein the hinged portion includes a secondary retention mechanism comprising:
a lug projecting outwardly from the hinged portion;
an aperture defined in the engagement latch and sized to receive the lug; and
a retention pin sized to be received within the lug.

6. The bottom-hole assembly of claim 5, further comprising:
a safety clip configured to be received within an orifice defined in the retention pin and operable to prevent the retention pin from dislodging from the lug;
a tether secured to the hinged portion and operatively coupled to both the retention pin and the safety clip.

7. The bottom-hole assembly of claim 3, wherein the stationary and hinged portions each exhibit a curved shape configured to extend about the outer circumference of the MWD tool.

8. The bottom-hole assembly of claim 1, wherein the mount further comprises one or more flanges operable to secure the projection instrument to the mount.

9. The bottom-hole assembly of claim 1, wherein the instrument line is positioned on the stationary portion of the upper clamp.

10. The bottom-hole assembly of claim 1, wherein the projection instrument is a laser or a light emitting diode (LED).

11. The bottom-hole assembly of claim 1, wherein the projection detection sensor includes a display operable to visually display at least one of an arc length or a calculated offset angle.

12. A method, comprising:
making up a bottom hole assembly (BHA) that includes:
a measurement while drilling (MWD) tool including a first reference line;
a downhole directional tool operatively coupled to the MWD tool and arranged downhole therefrom, the downhole directional tool including a second reference line;
mounting a projection device to the MWD tool, the projection device including:
a mount that includes opposing upper and lower clamps, and a spacer extending between the upper and lower clamps; and
a projection instrument operatively coupled to the mount; and
aligning an instrument line provided on the mount with the first reference line and thereby aligning the projection device with the MWD tool;
mounting a projection detection sensor to the downhole directional tool, the projection detection sensor including a reference point;
aligning the reference point with the second reference line;
activating the projection device and conveying a beam of light to the projection detection sensor;
calculating an angular offset between the first and second reference lines based on an arc length between the reference point and a location where the beam of light impinges on the projection detection sensor.

13. The method of claim 12, wherein making up the BHA comprises coupling one or more additional downhole tools between the MWD tool and the downhole directional tool.

14. The method of claim 12, further comprising:
removing the projection detection sensor from the downhole directional tool;
lowering the BHA below a rotary table until the MWD tool is positioned above the rotary table; and
removing the projection device from the MWD tool.

15. The method of claim 12, further comprising remotely activating the projection device.

16. The method of claim 12, further comprising mounting the projection instrument to the mount at one or more flanges of the mount.

17. The method of claim 12, further comprising:
detecting the light beam with the projection detection sensor;
measuring the arc length between the reference point and a location where the beam of light impinges on the projection detection sensor; and
displaying, on a display in communication with the projection detection sensor, a calculated offset angle.

18. A projection device, comprising:
a mount configured to be secured to the exterior of a downhole tool, the mount including:
an upper clamp;
a lower clamp axially offset from the upper clamp; and
a spacer extending between the upper and lower clamps; and
a projection instrument operatively coupled to the mount and operable to generate and convey a beam of light.

19. The projection device of claim 18, wherein each clamp includes:
a stationary portion;
a hinged portion pivotably coupled to the stationary portion via a hinge; and
a latching mechanism operable to secure the hinged portion to the stationary portion and thereby secure the projection device to the downhole tool.

20. The projection device of claim 19, wherein the latching mechanism further comprises:
an engagement latch pivotably attachable to the hinged portion of the upper and lower clamps;
an engagement pin operatively coupled to the engagement latch via an extension bar extending between the engagement latch and the engagement pin; and
one or more retention hooks provided on the stationary portion, sized to receive and secure the engagement pin.

* * * * *